United States Patent [19]

Kato et al.

[11] Patent Number: 5,203,577
[45] Date of Patent: Apr. 20, 1993

[54] MECHANISM FOR HOLDING SEATING UNIT OF BABY CARRIAGE ENGAGEMENT

[75] Inventors: Hitoshi Kato; Yuuichi Arai, both of Tokyo, Japan

[73] Assignee: Combi Corporation, Tokyo, Japan

[21] Appl. No.: 732,291

[22] Filed: Jul. 18, 1991

[30] Foreign Application Priority Data

Jul. 20, 1990 [JP] Japan ................ 2-76605[U]

[51] Int. Cl.$^5$ .................................................. B62B 7/14
[52] U.S. Cl. ...................................... 280/30; 280/643; 280/47.38; 297/130
[58] Field of Search ............... 280/30, 643, 648, 508, 280/506, 47.38, 47.39, 47.40, 47.41, 47.18, 47.26; 297/118, 134, 130

[56] References Cited

U.S. PATENT DOCUMENTS

| 763,771 | 6/1904 | Lukens et al. | 280/508 |
|---|---|---|---|
| 921,361 | 5/1909 | Chambers | 280/30 |
| 1,167,525 | 1/1916 | Rundle | 280/30 |
| 2,509,972 | 5/1950 | Gottfried | 280/30 |
| 2,982,562 | 5/1961 | Gladstein | 280/30 |
| 3,029,087 | 4/1962 | Alsop | 280/47.371 |
| 3,083,997 | 4/1963 | Chreist | 280/30 |
| 4,385,769 | 5/1983 | Molino | 280/30 |
| 4,664,396 | 5/1987 | Pierafesa | 280/30 |
| 4,861,105 | 8/1989 | Merten et al. | 297/130 |
| 4,984,813 | 1/1991 | Takahashi et al. | 280/30 |

FOREIGN PATENT DOCUMENTS

| 261323 | 9/1977 | Fed. Rep. of Germany . |
|---|---|---|
| 3626298 | 12/1987 | Fed. Rep. of Germany . |
| 2379417 | 9/1978 | France . |
| 2407111 | 5/1979 | France . |

*Primary Examiner*—David M. Mitchell
*Attorney, Agent, or Firm*—Sughrue, Mion, Zinn, Macpeak & Seas

[57] ABSTRACT

A baby carriage including a seating unit for holding a baby, a body portion for supporting the seating unit and including several wheels; and an engagement mechanism, coupled to the seating unit and the body portion, for releasably coupling the seating unit to the body portion. The engagement mechanism includes a plate, an engagement/disengagement lever and a stopper. The seating unit includes engagement juts which are fitted into a fitting notch of the plate when the seating unit is coupled to the body portion, and which are not fitted into the fitting notch when the seating unit is released from the body portion.

15 Claims, 4 Drawing Sheets

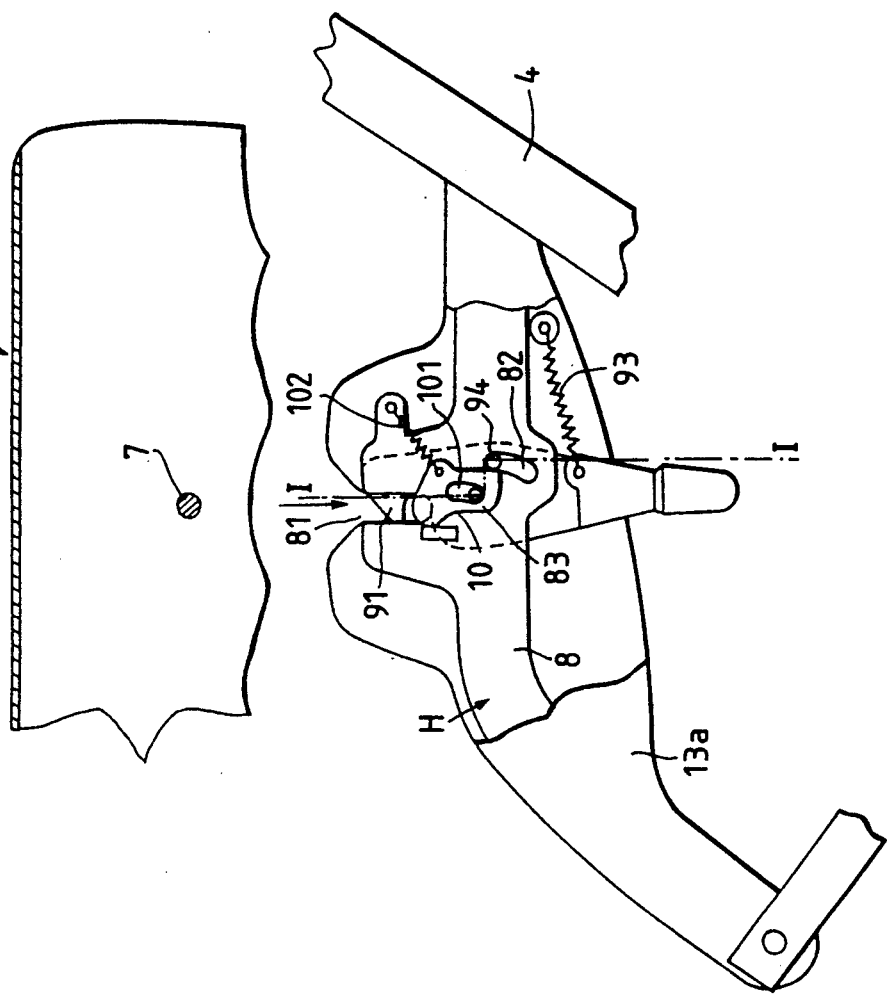
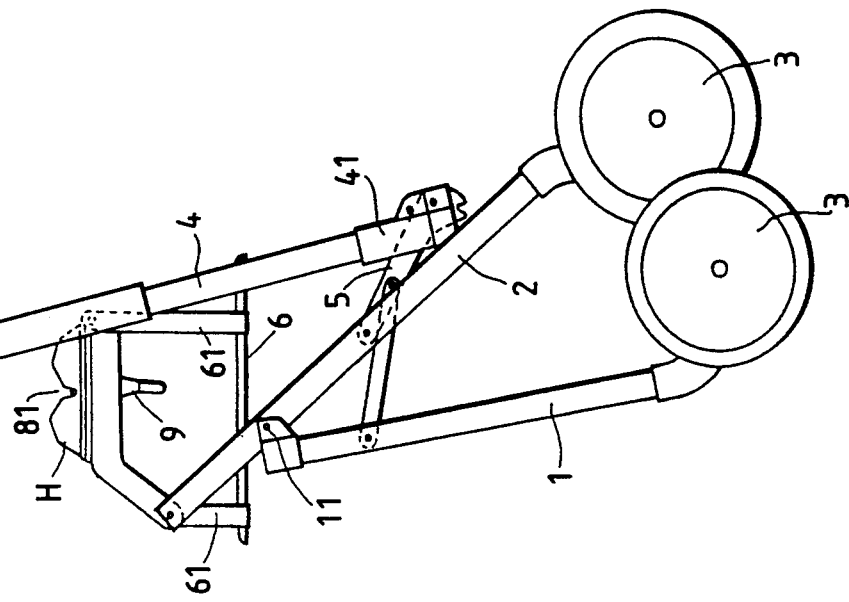

MECHANISM FOR HOLDING SEATING UNIT OF BABY CARRIAGE ENGAGEMENT

FIELD OF THE INVENTION

The present invention relates to a baby carriage and, in particular to a mechanism for the seating unit of the baby carriage.

BACKGROUND OF THE INVENTION

In a conventional baby carriage, the seating unit thereof is fixedly secured to the body of the carriage. In another conventional baby carriage a seating unit, which supports the lower half of the baby's body, is secured to the body of the vehicle, and a back set up from the rear of the seating unit can be optionally swung up and down through a reclining operation. The conventional baby carriages discussed above are problematic or disadvantageous in that the baby must be removed from the baby carriage if the carriage cannot be wheeled to the desired destination, e.g., when placing the baby in a motor vehicle. As a result, a baby who is sleeping in the conventional baby carriage will often be awaken when moved to the desired destination.

SUMMARY OF THE INVENTION

The present invention was developed in order to overcome the problem attendant with the conventional baby carriages.

Accordingly, it is an object of the present invention to provide a baby carriage having a body and a seating unit which is removably coupled to the body.

It is another object of the present device to provide a mechanism for removably holding the seating unit of a baby carriage that it is very simple to operate.

These and other objects of the invention are provided by the baby carriage of the present invention which includes a seating unit for holding the baby, a body portion for supporting the seating unit, and an engagement mechanism coupled to the seating unit and the body portion for releasably coupling the seating unit to the body portion.

BRIEF DESCRIPTION OF THE DRAWINGS

FIG. 3 is a side view of the body portion of the carriage in a state wherein the body is collapsed.

FIG. 4 is a side view of an engagement means according to the invention in the state that an engagement jut on the seating unit is not fitted in the engagement means.

DETAILED DESCRIPTION OF THE PREFERRED EMBODIMENTS

Figure 1:
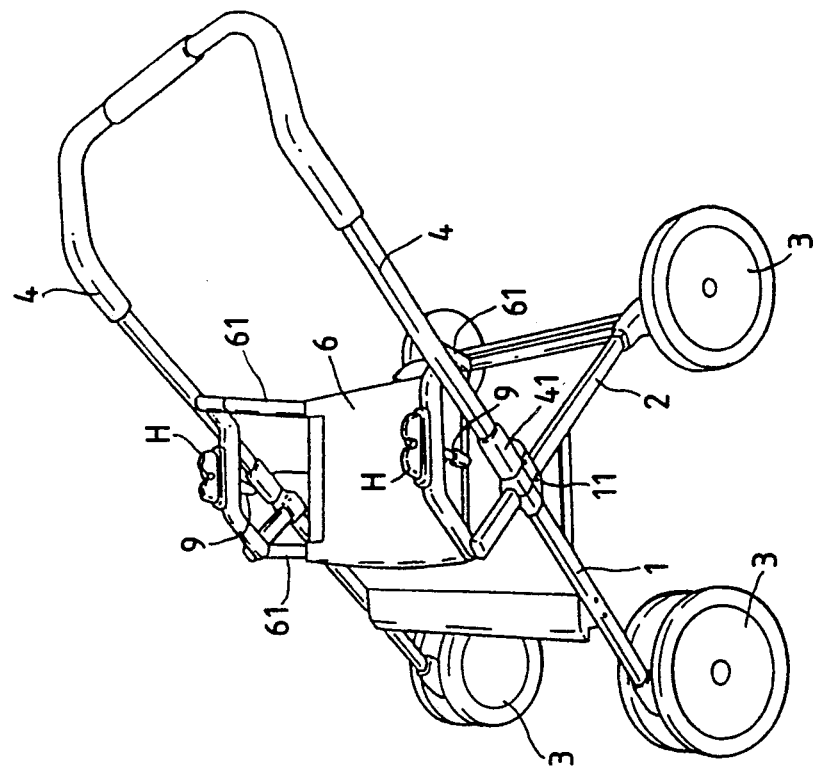
FIG. 1 is a side view of a baby carriage according to the present invention.

As shown in FIGS. 1–9, the baby carriage according to the invention includes a body portion B and a seating unit C which is removably attached to the body portion B and can be used as a baby carrier.

The body portion B includes front leg rods 1, rear leg rods 2, a handle rod 4, and a support plate 6. The front leg rods 1 are fitted with wheels 3 at the lower ends thereof. The rear leg rods 2 are fitted with other wheels 3 at the lower ends thereof. The upper ends of the front leg rods 1 are pivotally coupled to the rear leg rods 2 at pivot 11 near the upper ends of the rear leg rods so that the front and the rear leg rods 1 and 2 look like an X when seen in the transverse direction of the baby carriage, and so that the body portion B is collapsible as shown in FIG. 3. The handle rod 4 is coupled to the front leg rods 1 at the upper ends thereof so that the handle rod looks continuous to the front leg rods. Brackets 5 are provided for collapsing the body B and can also be used as stoppers for keeping the body uncollapsed. The brackets 5 are attached to the handle rod 4 and the rear leg rods 2, and extend from the ends of the handle rod to the intermediate portions of the rear leg rods 2, respectively, so that the front leg rods 1, the rear leg rods 2, the handle rod 4 and the brackets 5 are all joined together.

Figure 2:
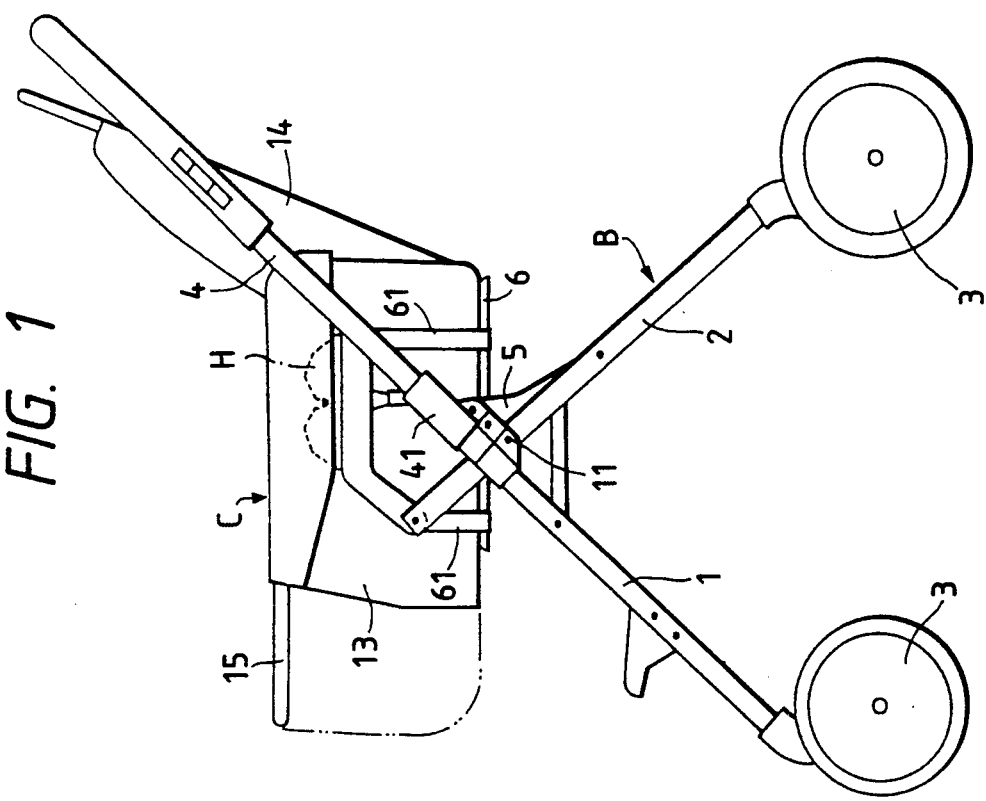
FIG. 2 is a perspective view of the baby carriage in a state wherein the seating unit is removed therefrom.
Figure 5:
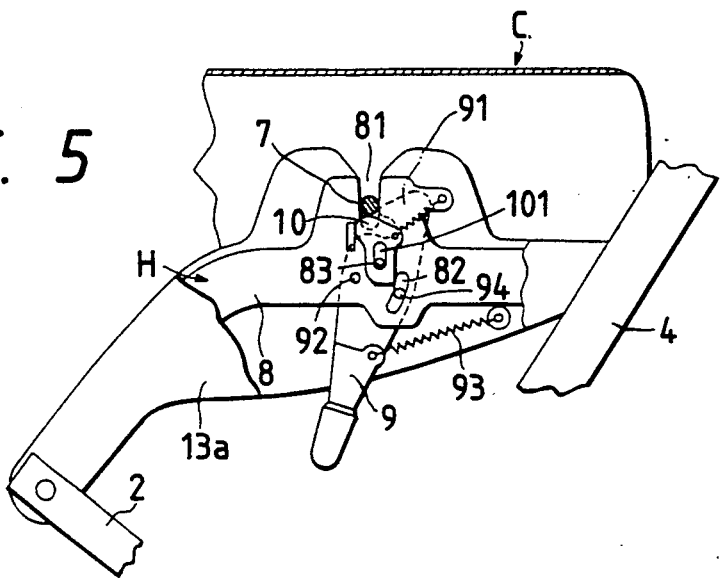
FIG. 5 is a side view of the engagement means in the state that an engagement hook formed on an engage/disengage lever at the upper end thereof is swung backward by fitting the engagement jut in the engagement means.

As shown in FIG. 2, engagement members 41 are fitted on the handle rod 4 at the end thereof so as to be movable in an up and down direction, and are engaged with the brackets 5 to keep the body B uncollapsed. The support plate 6 is provided for supporting the seating unit C at the bottom thereof. Hanger rods 61 are provided on the support plate 6 at both ends thereof and are pivotally coupled at the upper ends of the hanger rods 61 to the rear leg rods 2 at the upper ends thereof or to the handle rod 4 near the ends thereof, so that the support plate 6 is hung with the hanger rods between both the sides of the body B.

The baby carriage also includes engagement means H for holding the seating unit C through engagement and are attached to the rear leg rods 2 at the upper ends thereof and the handle rod 4 near the ends thereof. As shown in FIGS. 4–7, the baby carriage includes engagement juts 7 provided on the sides of the seating unit C. The juts 7 are fitted in the engagement means H to engage and hold the seating unit C with the body B.

As shown in FIGS. 4–8, each of the engagement means H includes a body 8 comprising a slender metal plate, an engage/disengage lever 9 pivotally coupled to the body 8 at the center of the inner side thereof, and a stopper or locking plate 10 attached to the body at the center of the outer side thereof so that the stopper 10 can be moved up and down. Although the lever 9 and the stopper 10 are located on mutually opposite sides of the body 8, the lever 9 and the stopper 10 may be located on the same side of the body.

The body 8 of each engagement means H extends horizontally with such a length that the ends of the body are located near the upper end of the rear leg rod 2 and the end of the handle rod 4, respectively. The central portion of the body 8 has a fitting notch 81 which extends vertically. The engagement jut 7 on the side of the seating unit C is fitted in the notch 81 to hold the seating unit with the body B through engagement.

Figure 6:
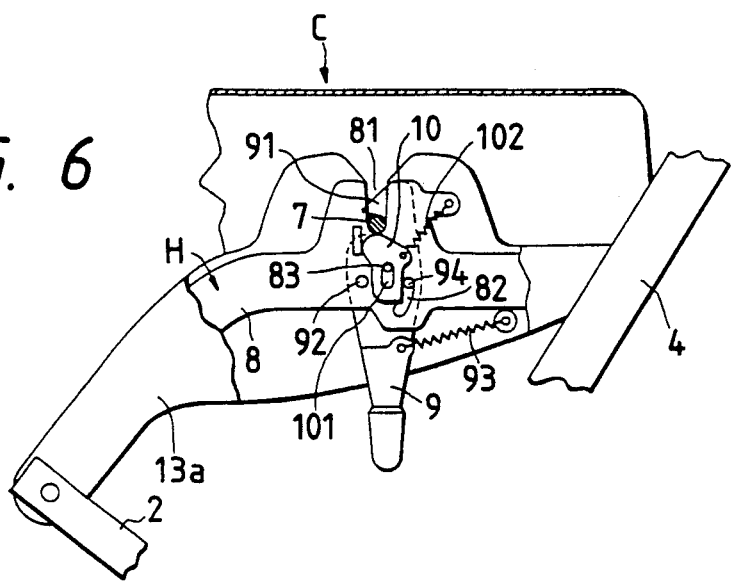
FIG. 6 is a side view of the engagement means in the state that the engagement jut is completely fitted in the engagement means.

The engage/disengage lever 9, which is pivotally coupled to the body 8 of the engagement means H at the center of the inner side of the body, comprises a plate, and slenderly extends vertically. The lever 9 has an engagement hook 91 at the upper end thereof, and is pivotally coupled to the body 8 at pivot 92 slightly under the engagement part of the hook 91. The lever 9 maintains the engagement jut 7 engaged with the engagement hook 91, as shown in FIG. 6, or forcibly disengages the hook 91 from the jut.

A return spring 93 is anchored to the engage/disengage lever 9 at the lower end thereof and to the body 8 so that the compressive force of the spring acts to pull the end of the lever 9 toward the spring 93 to set up the lever 9 to keep the engagement hook 91 in the engagement position thereof for the engagement jut 7 in the fitting notch 81.

A locking pin 94 is provided on the lever 9, and extends through the arc-shaped sliding hole 82 of the body 8 to the side thereof, on which a locking plate 10 is fitted. When the lever 9 is swung to disengage the hook 91 from the jut 7 so as to remove the seating unit C from the body B of the baby carriage, the locking pin 94 is engaged with the locking plate 10 at the lower end thereof to prevent the lever 9 from being swung back toward the original position thereof. The locking plate 10 is moved up and down along the fitting notch 81 of the body 8 of the engagement means H. When the locking plate 10 is in the most-moved-up position thereof, the upper end portion of the plate covers the lower end portion of the fitting notch 81, in which the engagement just 7 could be fitted. When the plate 10 is in the most-moved-down position thereof, the lower end of the plate 10 is located near the most-moved-down position of the locking pin 94 projecting from the lever 9.

A sliding hole 101 is provided in the central portion of the locking plate 10 so that the hole extends vertically. A guide pin 83 projecting sideward from the side of the body 8 of the engagement means H is fitted in the sliding hole 101 in order precisely to move the locking plate 10 up and down.

A spring 102 for returning the locking plate 10 to the original position thereof is anchored to the plate and the engagement means body 8 at their upper ends thereof, and always urges the plate by an upward force to return the plate to its original position.

A cover 13 covers the engagement means H, and includes two portions 13a covering both sides of the engagement means H to provide a pleasing appearance of the baby carriage and to prevent the components of the engagement means H from being exposed. The upper and lower parts of the cover 13 have notches and openings which are necessary to operate the engagement means H.

Referring to FIG. 1, the seating unit C includes a seating portion 13, a back 14 pivotally coupled to the seating portion 13 at the rear thereof so that the back can be swung up and down, and a hanger pipe 15 which is attached to the seating portion at the front thereof and to which a cover may be provided for covering the baby's feet.

The operation of the mechanism for holding the seating unit C of the baby carrier with the body B thereof through engagement is described in detail as follows:

When the body B and the seating unit C are not coupled to each other, the engagement means H is in a state shown in FIG. 4, and the compressive force of the return spring 93 acts so that the engage/disengage lever 9 coupled to the body 8 of the engagement means is put in a vertical position, and the engagement hook 91 of the lever covers a lower part of the fitting notch 81, in which the engagement jut 7 on the seating unit C should be fitted. The stopper 10 is moved up along the fitting notch 81 by the compressive force of the spring 102.

When the seating unit C is coupled to the body B, the engagement juts 7 on both the sides of the seating unit are fitted in the fitting notches 81 so that the juts 7 are engaged with the engagement means H to hold the seating unit with the body B. The engagement juts 7 come into contact with the tops of the engage/disengage levers 9 of the engagement means H as the juts 7 are moved down in the fitting notches 81. Along the further downward movement of the engagement juts 7 in contact with the tops of the engagement hooks 91 of the levers 9, the downward pressure of the jut 7 on the hooks pushes away the tops of the hooks 91 horizontally as shown by a dotted line in FIG. 5. The juts 7 come into contact with the tops of the stopper 10 on the sides of the bodies 8 engagement means H opposite the levers 9 and push the stoppers down as the juts are moved down yet further to the lower ends of the fitting notches 81. Since the pushing of the engagement hooks 91 by the engagement juts 7 is ceased as a result of the downward movement of the juts to the lower ends of the fitting notches 81, the levers 9 are put in the vertical positions thereof again so that the juts fitted in the notches are engaged with the lower edges of the hooks 91 and are therefore prevented from going out of the notches, as shown in FIG. 6. The lower end portions of the stoppers 10 pushed down by the moved-down juts 7 cover the lower parts of the sliding holes 82 in which the locking pins 94 are fitted.

Figure 7:
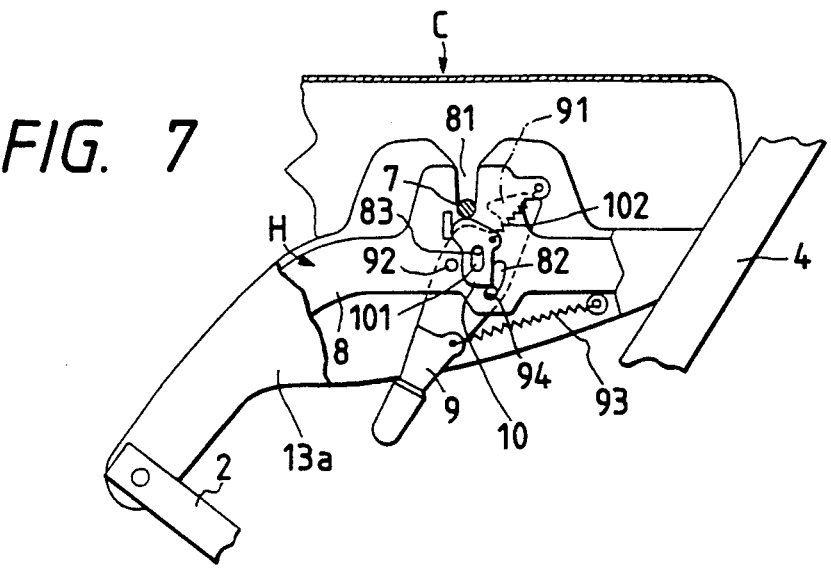
FIG. 7 is a side view of the engagement means in the state that the upper end of the engage/disengage lever is swung backward to disengage the engagement hook from the engagement jut to make it possible to remove the seating unit from the engagement means.
Figure 8:
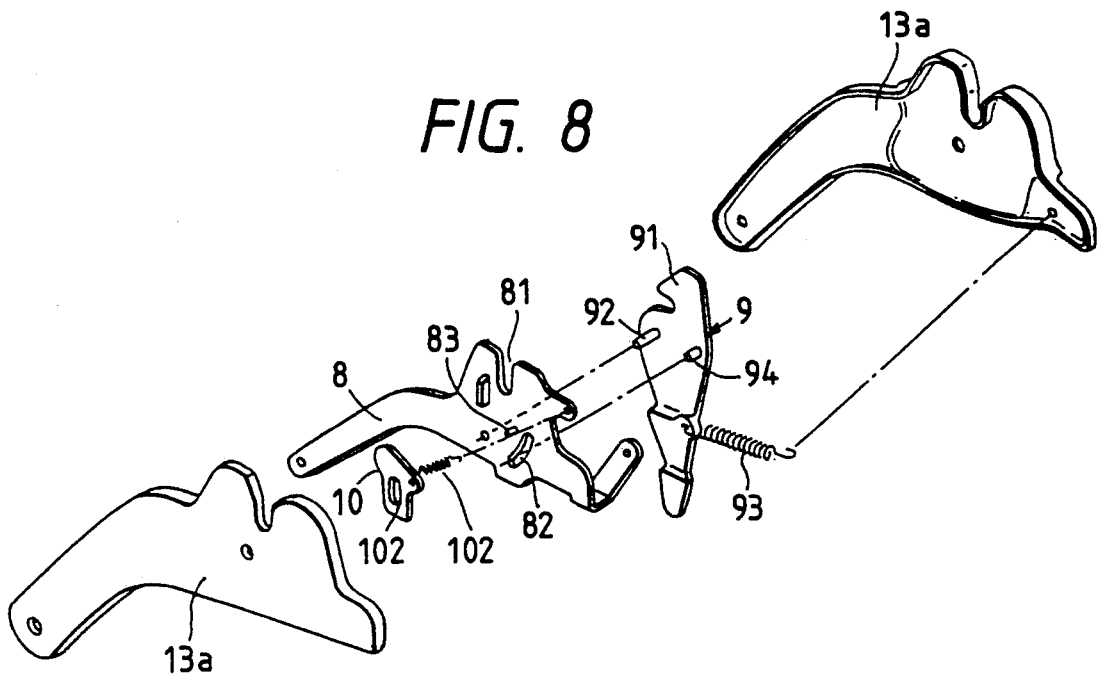
FIG. 8 is a perspective exploded view of the engagement means.
Figure 9:
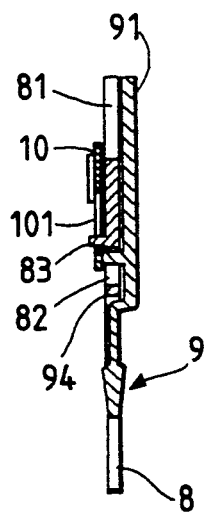
FIG. 9 is a sectional view of the engagement means along a line I—I shown in FIG. 4.

When the seating unit C is disengaged from the engagement means H so as to be capable of being removed from the body B, the lower ends of the engage/disengage levers 9 are swung leftward with regard to FIG. 6, from positions shown therein, against the forces of the springs 93 so that the locking pins 94 fitted in the sliding holes 82 are swung down therein while pushing away the lower end portions of the stoppers 10 from the lower parts of the sliding holes. The lower ends of the stoppers 10 are returned to the original positions thereof by the forces of the return springs 102 as the locking pins 94 reach the lower ends of the sliding holes 82 so that the pushing of the lower end portions of the stoppers 10 by the locking pins ceases. As a result, even if a force having swung the lower end of the lever 9 leftward as mentioned above is eliminated, the lever 9 is not swung back to the original position by the force of the spring 93, because the top of the locking pin 94 is engaged with the lower end of the stopper 10, as shown in FIG. 7. For that reason, the engagement hook 91 of the lever 9 is kept disengaged from the engagement jut 7, so that the seating unit C can be removed from the engagement means H.

When the seating unit C is removed from the body B by putting the engagement juts 7 out of the fitting notches 81, the pushing of the stopper 10 by the juts ceases so that the stoppers are instantaneously moved up. As a result, the lower ends of the stoppers 10 are disengaged from the locking pins 94 so that the engage/disengage levers 9 are put back into the vertical positions thereof to prepare for the next fitting of the engagement juts 7 into the engagement means H, as shown in FIG. 4.

The mechanism for holding the seating unit C of the baby carriage with the body B thereof through engagement has desirable effects as follows:

Since the intermediate portion of the engage/disengage lever 9 is pivotally supported at pivot 92 so that the engagement hook 91 of the lever covers the lower part of the fitting notch 81, the hook can be automatically swung and engaged with the engagement jut 7 on the side of the seating nit C, only by fitting the jut into the notch. This operation is simple and convenient. When the jut 7 is completely fitted in the notch 81, the hook 91 is automatically returned to the original position so that the user of the baby carriage does not need to perform a return operation.

The hook 91 engaged with the jut 7 prevents it from being moved up in the fitting notch 81. For that reason, the seating unit C is always safely held with the body B so that the seating unit does not become disengaged from the engagement means H.

Since the stopper 10 is attached to the body 8 of the engagement means H near the lower end of the fitting notch 81 so that the stopper is movable up and down and the lower end of the stopper is engaged with the locking pin 94 provided on the engage/disengage level 9, the stopper acts so that the lever swung to an oblique position in order to remove the seating unit C from the body B is prevented from being swung back from the oblique position and is therefore kept in that position. As a result, nothing hinders the removal of the engagement jut 7 from the engagement means H, so that the seating unit C can be lifted off the body B by both hands of the baby carriage user. The seating unit C can thus be safely attached to and detached from the body B.

What is claimed is:

1. A baby carriage comprising:
a seating unit for holding a baby;
a body portion for supporting said seating unit, said body portion including a plurality of wheels; and
engagement means, coupled to said seating unit and said body portion, for releasably coupling said seating unit to said body portion, said engagement means comprising a body having a fitting notch for receiving an engagement jut, an engagement/disengagement lever pivotally coupled to said body, and a stopper movably attached to a side of said body, said stopper movable along the fitting notch, and to a position which prevents pivotal motion of said engagement/disengagement lever in a first direction.

2. The baby carriage as defined in claim 1, wherein said body portion includes a plurality of front leg rods having respective wheels attached at ends thereof, and a plurality of rear leg rods having respective wheels attached at ends thereof.

3. The baby carriage as defined in claim 1, wherein said seating unit includes an engagement jut disposed on a side thereof, said engagement jut being removably fitted in said engagement means.

4. The baby carriage as defined in claim 3, wherein said seating unit includes a pair of engagement juts disposed on opposite sides thereof, each of said pair of engagement juts being removably fitted in said engagement means.

5. The baby carriage as defined in claim 1, wherein said body portion of said engagement means comprises a plate having a fitting notch which extends vertically in a central portion thereof.

6. The baby carriage as defined in claim 5, wherein said engagement/disengagement lever includes an engagement hook portion at an upper end thereof so that said engagement/disengagement lever can be pivotally moved to cover a lower part of the fitting notch of said plate.

7. The baby carriage as defined in claim 1, further comprising means for urging said engagement/disengagement lever in the first direction; such that said engagement/disengagement lever is urged a vertical position.

8. The baby carriage as defined in claim 7, wherein said urging means is a spring.

9. The baby carriage as defined in claim 1, further comprising means for urging said stopper in a direction which moves said stopper upward.

10. The baby carriage as defined in claim 9, wherein said urging means is a spring.

11. The baby carriage as defined in claim 1, wherein said seating unit includes an engagement jut disposed on a side thereof, and wherein said engagement means includes a body plate having a fitting notch, said engagement jut of said seating unit being fitted into said fitting notch when said seating unit is coupled to said body portion.

12. The baby carriage as defined in claim 1, wherein said seating unit includes an engagement jut disposed on a side thereof, and wherein said engagement means includes a body plate having a fitting notch, said engagement jut of said seating unit being disposed outside of said fitting notch when said seating unit is released from said body portion.

13. A baby carriage comprising:
a seating unit for holding a baby;
a body portion for supporting said seating unit, said body portion including a plurality of wheels; and
engagement means, coupled to said seating unit and said body portion, for releasably coupling said seating unit to said body portion, wherein said engagement means comprises a body, an engagement/disengagement lever pivotally coupled to said body portion, and a stopper movably attached to a side of said body portion, and wherein said engagement/disengagement lever and said stopper are attached to opposite sides of said body portion of said engagement means, respectively.

14. A baby carriage comprising:
a seating unit for holding a baby;
a body portion for supporting said seating unit, said body portion including a plurality of wheels; and
engagement means, coupled to said seating unit and said body portion, for releasably coupling said seating unit to said body portion, wherein said engagement means comprises a body and an engagement/disengagement lever pivotally coupled to said body portion of said engagement means, wherein said body portion of said engagement means comprises a plate having a fitting notch which extends vertically in a central portion thereof, wherein said engagement/disengagement lever includes an engagement hook portion at an upper end thereof so that said engagement/disengagement lever can be pivotally moved to cover a lower part of the fitting notch of said plate, and wherein said engagement/disengagement lever further includes a locking pin which projects therefrom.

15. The baby carriage as defined in claim 14, wherein said engagement/disengagement lever can be pivotally moved such that said locking pin is engaged with a lower end of a stopper.

* * * * *